US011885035B2

(12) United States Patent
Proshkin et al.

(10) Patent No.: US 11,885,035 B2
(45) Date of Patent: Jan. 30, 2024

(54) FORMATION OF LINING LAYERS IN THE CATHODE SHELLS OF ALUMINIUM ELECTROLYTIC REDUCTION CELLS

(71) Applicant: Obshchestvo S Ogranichennoy Otvetstvennost'yu "Obedinennaya Kompaniya Rusal Inzhenerno-Tekhnologicheskiy Tsentr", Krasnoyarsk (RU)

(72) Inventors: Aleksandr Vladimirovich Proshkin, Krasnoyarsk (RU); Samuil Yakovlevich Levenson, Krasnoyarsk (RU); Vitalij Valer'evich Pingin, Krasnoyarsk (RU); Aleksej Vasil'evich Morozov, Krasnoyarsk (RU); Andrej Gennad'evich Sbitnev, Krasnoyarsk (RU); Mikhail Aleksandrovich Lantsevich, Krasnoyarsk (RU); Vyacheslav Andreevich Goldobin, Krasnoyarsk (RU)

(73) Assignee: OBSHCHESTVO S ORGANICHENNOY OTVETSTVENNOST'YU "OBEDINENNAYA KOMPANIYA RUSAL INZHENERNO-TEKHNOLOGICHESKIY TSENTR", Krasnoyarsk (RU)

( * ) Notice: Subject to any disclaimer, the term of this patent is extended or adjusted under 35 U.S.C. 154(b) by 0 days.

(21) Appl. No.: 18/086,184

(22) Filed: Dec. 21, 2022

(65) Prior Publication Data

US 2023/0121723 A1 Apr. 20, 2023

Related U.S. Application Data

(63) Continuation of application No. 16/757,330, filed as application No. PCT/RU2018/050107 on Sep. 7, 2018, now Pat. No. 11,566,335.

(30) Foreign Application Priority Data

Oct. 19, 2017 (RU) ........................... RU2017136943

(51) Int. Cl.
*C25C 3/08* (2006.01)
*C23C 2/12* (2006.01)
(Continued)

(52) U.S. Cl.
CPC .............. *C25C 3/085* (2013.01); *B05C 5/007* (2013.01); *B05C 11/023* (2013.01); *B05C 19/04* (2013.01); *B05D 1/40* (2013.01); *C23C 2/12* (2013.01)

(58) Field of Classification Search
CPC ........... B05C 5/007–008; B05C 11/023; B05C 19/04; C25C 3/085; C23C 2/12
See application file for complete search history.

(56) References Cited

U.S. PATENT DOCUMENTS 2,348,178 A 5/1944 Merle
4,462,520 A * 7/1984 Strehlow ................ B65G 47/19 198/525
(Continued)

FOREIGN PATENT DOCUMENTS

CN 1928161 A 3/2007
RU 2266983 C1 12/2005
(Continued)

OTHER PUBLICATIONS

International Search Report and Written Opinion dated Dec. 20, 2018 in connection with International Application No. PCT/RU2018/050107, 7 pages.
(Continued)

*Primary Examiner* — Dah-Wei D. Yuan
*Assistant Examiner* — Stephen A Kitt
(74) *Attorney, Agent, or Firm* — BAKER & MCKENZIE LLP

(57) ABSTRACT

This disclosure relates to non-ferrous metallurgy and electrolytic production of Aluminium for lining a cathode
(Continued)

assembly of an electrolytic cell. The present method includes laying materials while simultaneously distributing same over the surface of a base and levelling them at a height measured from the plane of the top edge of the shell of the cathode assembly of the electrolytic cell by gradually moving a device for installing unformed lining materials along a longitudinal axis of the cathode of the Aluminium electrolytic cell. Said device is configured in the form of a bridge equipped with a mechanical drive for movement. The bridge has guides on which a frame is mounted for vertical movement, said frame having cassettes provided with gates with a mechanical drive. The technical result is reduced labor costs, healthier working conditions for operatives, and better quality installation of the base of an electrolytic cell.

4 Claims, 5 Drawing Sheets

(51) Int. Cl.

| | |
|---|---|
| ***B05C 11/02*** | (2006.01) |
| ***B05C 19/04*** | (2006.01) |
| ***B05C 5/00*** | (2006.01) |
| ***B05D 1/40*** | (2006.01) |

(56) References Cited

U.S. PATENT DOCUMENTS

| | | | | |
|---|---|---|---|---|
| 6,258,224 | B1 | 7/2001 | Mirtchi | |
| 2004/0086638 | A1* | 5/2004 | Aschenbeck | D21J 1/20 427/180 |
| 2015/0275381 | A1* | 10/2015 | Proshkin | C25C 3/08 118/108 |
| 2021/0189577 | A1 | 6/2021 | Proshkin et al. | |

FOREIGN PATENT DOCUMENTS

| | | | |
|---|---|---|---|
| RU | 2270887 | C2 | 2/2006 |
| RU | 2296819 | C1 | 4/2007 |
| RU | 2385972 | C1 | 4/2010 |
| RU | 2606374 | C1 | 1/2017 |
| SU | 1183564 | A1 | 10/1985 |
| WO | 2017138843 | A1 | 8/2017 |
| WO | 2019078764 | A1 | 4/2019 |

OTHER PUBLICATIONS

Supplementary European search report dated May 31, 2021 in connection with European Application No. 18868602.6, 7 pages.

Search Report dated May 28, 2018 in connection with Russian patent application No. 2017136943, 2 pages.

* cited by examiner

FORMATION OF LINING LAYERS IN THE CATHODE SHELLS OF ALUMINIUM ELECTROLYTIC REDUCTION CELLS

CROSS-REFERENCE TO RELATED APPLICATIONS

This application is a continuation of U.S. patent application Ser. No. 16/757,330 filed Apr. 17, 2020, which is a U.S. National Stage Application of and claims priority to International Application No. PCT/RU2018/050107 filed Sep. 7, 2018, which claims priority to Russian Patent Application No. 2017136943 filed Oct. 19, 2017, the entire contents of which are hereby incorporated in their entirety by reference.

FIELD OF THE INVENTION

The invention is directed to non-ferrous metallurgy, and in particular, to electrolytic Aluminium production; it can be used to form lining layers in the cathode shell of an Aluminium electrolysis cell.

PRIOR ART

An embodiment of a method for lining electrolysis cell cathodes is known (Brandtzeg S. R., Paulsen K A., Siljan O. J. and Thovsen K *Experiences with Anorthite Powder Based Penetration Barrier in* 125 kA *Soderberg Cell Cathodes. Light Metals,* 1993, pp. 309-314), wherein heat-insulating bricks or slabs of various sizes are laid on the bottom of the shells of electrolysis cells, followed by laying refractory bricks and pouring a dry barrier mixture of anorthite material out of big bags, preliminarily spreading it over the area of the sub-cathode space using shovels and scrapers, finally leveling it using a rail or metal angle bar moved by workers along the upper edge of the formwork installed on the rims along the longitudinal side of the cathode assembly, covering the surface with polyethylene film and sheets of textile composite laminate or fiberboard, installing a construction site vibrator for sand mixture compaction using a pot tending machine, and moving the vibrator by two workers spirally from the periphery to the center in three passes.

The drawbacks of this method and the device used to embody the method are high labor inputs, the long time required to re-line the electrolysis cells, unsanitary working conditions for the personnel due to material dusting, and the impossibility of reusing the lining materials.

Another embodiment of the method for lining electrolysis cell cathodes is also known (Brandtzeg S. R., Paulsen K. A., Siljan O. J. and Thovsen K. *Experiences with Anorthite Powder Based Penetration Barrier in* 125 *kA Soderberg Cell Cathodes. Light Metals,* 1993, pp. 309-314), which comprises laying the rim (the peripheral zone of the cathode assembly), pouring and spreading alumina over the central zone area using shovels and scrapers, pouring a dry barrier mixture onto the formed surface, spreading and leveling the mixture over the alumina area using shovels, scrapers, rails or a metal angle bar, covering the surface with polyethylene film and sheets of textile composite laminate or fiberboard, and performing the final compaction using a site vibrator.

The drawbacks of this method and the device used to embody the method are high labor inputs, unsanitary working conditions for the personnel due to material dusting, and low accuracy of the heat-insulating alumina layer, which reduces the service life of the electrolysis cell.

A method is also known for lining the cathode assembly of an electrolysis cell for Aluminium production (Rusal patent RU 2606374, C25C 3/08, Jan. 10, 2017), wherein the heat-insulating non-graphitic carbon layer of the electrolysis cell base is loaded into the cathode assembly shell, a refractory layer is formed by pouring aluminosilicate powder and then compacted by vibration pressing, bottom and side blocks are installed and the joints between them are then sealed with a cold ramming paste. Said heat-insulating material is placed into the cassette modules, the electrolysis cell base is installed comprising at least one layer of said cassette modules, and the joints between them are filled with non-graphitic carbon. Preferably, the length of the cassette modules is half the width of the cathode assembly, and the width of the cassette modules is half their length; polypropylene is the material used for the cassette modules, a cross arm with six suspension points for the cassette module is used to install the cassette modules.

The drawbacks of this method are high labor inputs when filling the polypropylene cassette modules, and low accuracy of the resulting heat-insulating layer, which reduces the service life of the electrolysis cell.

A method is known for lining the cathode assembly of an Aluminium electrolysis cell with a cathode shell and coal bottom blocks (Inventor's Certificate SU 1183564, C25C 3/08, Dec. 7, 1985), which comprises pouring onto the shell bottom, spreading over the surface of the base, leveling and compacting the heat-insulating material layer to a density of 0.8-1.1 $t/m^3$, pouring the next portion of the heat-insulating material onto the resulting layer, spreading it over the surface of the previous layer, leveling and compacting it to a density of 1.2-1.8 $t/m^3$.

The drawbacks of this method are high labor inputs needed to spread the material over the surface of the cathode shell and to compact each layer, unsanitary working conditions for the personnel due to material dusting, and poor installation quality of the electrolysis cell base due to inaccurate leveling of the layer height and lack of flatness.

A device is known for leveling a fusion mixture layer on the pallets of a sintering machine during the sintering mixture preparation and sintering on conveyor-type sintering machines at sinter plants for metallurgical raw materials (patent RU 2007678, F27B 21/00, Feb. 15, 1994). The device comprises a knife shaped in plan view, symmetric with respect to the longitudinal axis of the pallet, and positioned with its top toward the movement direction of the fusion mixture layer. The knife has a concave working surface in the longitudinal section, with the lines tangent to the lower cutting and upper parts forming 30-40 and 60-90 angles with the horizontal plane, respectively; the angle between the tangent to the generatrix and the pallet axis is 60-50, with the specified interval decreasing from the top to the ends of the knife. In plan view, the knife may be U-shaped, or its working surface may be stepped, with the length of each step being ⅓-¼ of the knife length.

As applied to the task of lining electrolysis cell cathodes, the drawback of this device is the need to load the lining material into the electrolysis cell shell and its dusting, the need to use a separate actuator to move the knife, which, in conjunction with the cathode being much wider than the sintering machine pallet, makes the device cumbersome and inoperable.

The closest analogue to the proposed method and device in terms of technical essence and a combination of essential features is a method of forming seamless lining layers in Aluminium electrolysis cells and a device for its embodiment (Rusal patent RU 2296819, IPC C25C3/06, C25C3/08, Apr. 10, 2007). The method comprises pouring a powdered material into the electrolysis cell shell, leveling it using a rail, covering the poured material with a layer of dust-insulating film, and compacting the material in two steps: preliminary static and final dynamic compaction. The lining layer is formed by moving the working members of static and dynamic compaction along the longitudinal axis of the cathode of the Aluminium electrolysis cell to the entire width of the barrier material at a speed of 0.21-0.24 m/min; the dynamic compaction of the material is performed at an oscillation frequency of not more than 55 Hz and a constant static load on the vibration units using spring-loaded balance weights with a specific weight (per unit length of the compaction tool) of at least 150 kg/m. The compaction process is carried out through a stiff rubber layer having a thickness of 5-25% of the barrier layer height. The device comprises a drive and a compaction tool including a static processing unit configured as a driven wheel, and a dynamic processing unit connected to the wheel by means of a rocker arm and a rod, and configured as a vibration unit including a vibration exciter with a directed impact force and installed to allow movement around the horizontal axis of the wheel. The invention extends service life by slowing down the penetration rate of the cryolite-alumina melt components into the heat-insulating portion of the base and retaining the thermophysical properties of the latter.

The drawback of the prototype is that the unformed materials are installed using shovels and scrapers, causing poor installation quality of the electrolysis cell base due to inaccurate leveling of the layer height, high labor inputs during preliminary and final leveling of the lining materials, and unsanitary working conditions for the personnel.

DISCLOSURE OF THE INVENTION

The technical problem and technical result of the proposed invention is the improved installation quality of the cathode shell of an Aluminium electrolysis cell due to more accurate leveling of the height of the lining layers, which results in extended service life of electrolysis cells, and reduced labor inputs and dusting of the lining material.

The posed problem is solved and the technical result is achieved as follows: in the method of forming the lining layers in the cathode shell of an Aluminium electrolysis cell wherein layers are poured onto the bottom of the cathode shell, spread over the surface of the cathode shell and leveled, another portion of the lining material is poured onto the resulting layer, spread over the surface of the previous layer and leveled, according to the claimed invention, the lining materials are poured and the layers are spread over the surface of the cathode shell simultaneously, and the layers are leveled at a preset level measured from the plane of the upper edge of the cathode shell of the Aluminium electrolysis cell.

Two and/or more lining layers with variable physical and performance properties (porosity, thermal conductivity, heat insulation) specified according to the technology and caused by the design features of the electrolysis cell are formed in succession.

The lining layers are poured, spread over the surface of the cathode shell and leveled at a rate of 0.2-0.9 m/min. It is expedient to additionally control the rate of pouring a layer, as well as the parameters of its spreading and leveling, and to adjust the operating conditions as necessary.

When the running speed of the device forming the lining layers falls below 0.1 m/min, the productivity decreases unreasonably, and when the speed increases above 0.9 m/min, the quality of laying the lining layers deteriorates and dusting of the lining material occurs.

Such method of lining the cathodes of Aluminium electrolysis cells with unformed lining materials ensures the mechanized, high-performance, virtually dust-free successive laying of lining layers of various lining materials, uniform spreading over the entire area of the cathode shell, and high-quality leveling of the lining layers at any level measured from the plane of the upper edge of the cathode shell of the electrolysis cell. This improves the installation quality of the electrolysis cell cathode shell due to high-quality leveling of the lining layers height, reduces the labor inputs required to spread the material over the surface of the cathode shell, and improves the working conditions for the personnel due to reduced dusting of the lining material.

The problem is also solved, and the technical result is also achieved by the fact that the device for forming the lining layers in the cathode shell of an Aluminium electrolysis cell for embodying the method is configured as a supporting metal structure fixable on the longitudinal sides of the cathode shell and sequentially moved along the longitudinal axis of the cathode shell of the Aluminium electrolysis cell, and contains longitudinal and transverse beams, a mechanical actuator mounted on the transverse beams, and vertical guides, wherein a frame is mounted on the vertical rails and configured for vertical movement, on which at least one cassette with a lining material is rigidly fixed and provided with a gate in the lower part designed to be controlled for pouring the lining material onto the surface of the cathode shell and for spreading and leveling the lining layers simultaneously with the edge of the gate. The edge of the gate is usually the outermost roller, on which a circular elastic belt is installed having a width equal to the roller length. The rollers covered with the circular elastic (for example, rubber) belt block the outlet window of the cassette with the material. They are fixed onto sectors rigidly connected to a pivoting shaft. When the shaft rotates, the rollers roll over the surface of the cassette, opening (and closing) its outlet orifice. The elastic (rubber) belt ensures tightness. Traction screws are designed to raise and lower the cassette frame with respect to the plane of the upper edge of the sides.

The proposed device is supplemented with particular characteristic features that help solve the posed problem in the optimum way.

The mechanical actuator is made up of two drive wheels receiving rotation from a gear motor mounted between the drive wheels by means of chain gears equipped with tensioners designed to ensure the reverse motion. This enables both the forward and reverse movement of the device on the sides along the longitudinal axis of the electrolysis cell cathode.

Discretely adjustable thrust rollers are secured on the bridge. The rollers provide contact of the unit with the side surface of the cathode to prevent the unit from going off the sides of the cathode.

Smoothly adjustable guide rollers are installed at the fixing points of the frame, with vertical guides for the forward and reverse movement.

Traction screws are pivotally suspended on the guides and engage with nuts pivotally mounted to the frame. The traction screws can be used to raise or lower the cassettes with lining materials to achieve accurate thicknesses of the lining material layers.

In the lower part of the cassette, a gate is provided, driven by a mechanical actuator mounted on the transverse side of the cassette.

The device comprises a control panel mounted on the exterior surface of the supporting metal structure.

The cassette is configured as a bin.

The gap between the cassette gate and the bottom of the cathode shell is equal to the thickness of the lining layer being laid.

The cassette gate is configured as belt-roller sections.

The bottom of the shell may be an alternative to the leveling level; however, in practice, it can be severely deformed. Various horizontal levels can also be an alternative; however, in this case, the horizontal leveling of the shell itself is required, which is technologically unprofitable. Since the unit moves along the sides, the horizontal plane of the sides is a reliable basis for leveling the lining layers.

A comparative analysis of the features of the claimed solution and the features of the analogue and prototype indicates that the solution meets the "novelty" requirement. The results of industrial tests of the proposed method and the device for its embodiment show that the following positive results have been achieved:

- extended service life of the electrolysis cell due to improved installation quality of its cathode shell caused by higher accuracy in leveling the height of layers of unformed lining materials;
- reduced labor inputs required to spread the lining layers over the surface of the cathode shell;
- substantially reduced dusting of the lining material, thus improving the working conditions for the personnel by making them more sanitary.

BRIEF DESCRIPTION OF THE DRAWINGS

The essence of the proposed method of forming the lining layers in the cathode shells of Aluminium electrolysis cells and the device used for its embodiment are illustrated by the specific exemplary embodiments of the method and the device design (FIG. 1-8).

Figure 1:
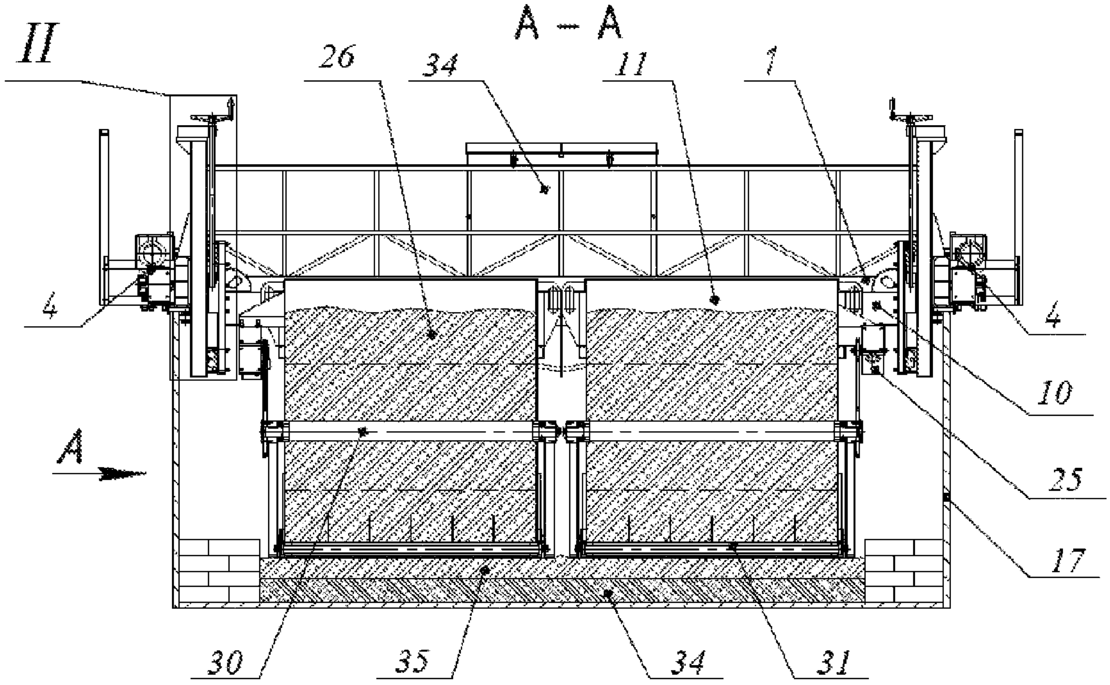
FIG. 1 shows the device for forming lining material layers—Section A-A.

The device for forming lining material layers (hereinafter referred to as the "device") comprises a supporting metal structure configured as a bridge 1, which is a spatial metal structure, whereon two longitudinal beams 2 and two transverse beams 3 are mounted. The bridge 1 is mounted on the transverse beams 3 with mechanical actuators 4 for moving the device along the longitudinal axis of the cathode of the Aluminium electrolysis cell and forming layers of lining materials. Scaffolds 5 and 6 with railings 7 and 8, respectively, are installed along the perimeter of the bridge 1. The bridge 1 comprises guides 9, whereon a frame 10 is arranged for vertical movement with cassettes 11, each equipped with a gate 12.

Mechanical actuators 4 mounted on the transverse beams 3 of the bridge 1 include two-stage gear motors 13, chain gears 14, tensioners 15 for reverse gears, and wide drive wheels 16 for the translational movement of the device. The drive wheels 16 are designed wide with limiting flanges to enable their use on electrolysis cells of different widths. For the device alignment during movement with respect to the longitudinal sides 17 of the cathode shell of the electrolysis cell, discretely adjustable thrust rollers 18 are provided in the bridge 1, which are pressed against and roll over the sides of the cathode shell, and are set by levers 19 with retainers 20 depending on the type of the electrolysis cell.

The frame 10 is equipped with two sets of smoothly adjustable guide rollers 21 to enable its clearance-free vertical movement along the guides 9 of the bridge 1. A mechanism for raising and lowering the cassettes is arranged on the guides of the metal structure 9. It includes of pivotally suspended traction screws 22 that engage with nuts 23, pivotally mounted on the frame 10. The screws 22 are rotated using flywheels 24.

Figure 2:
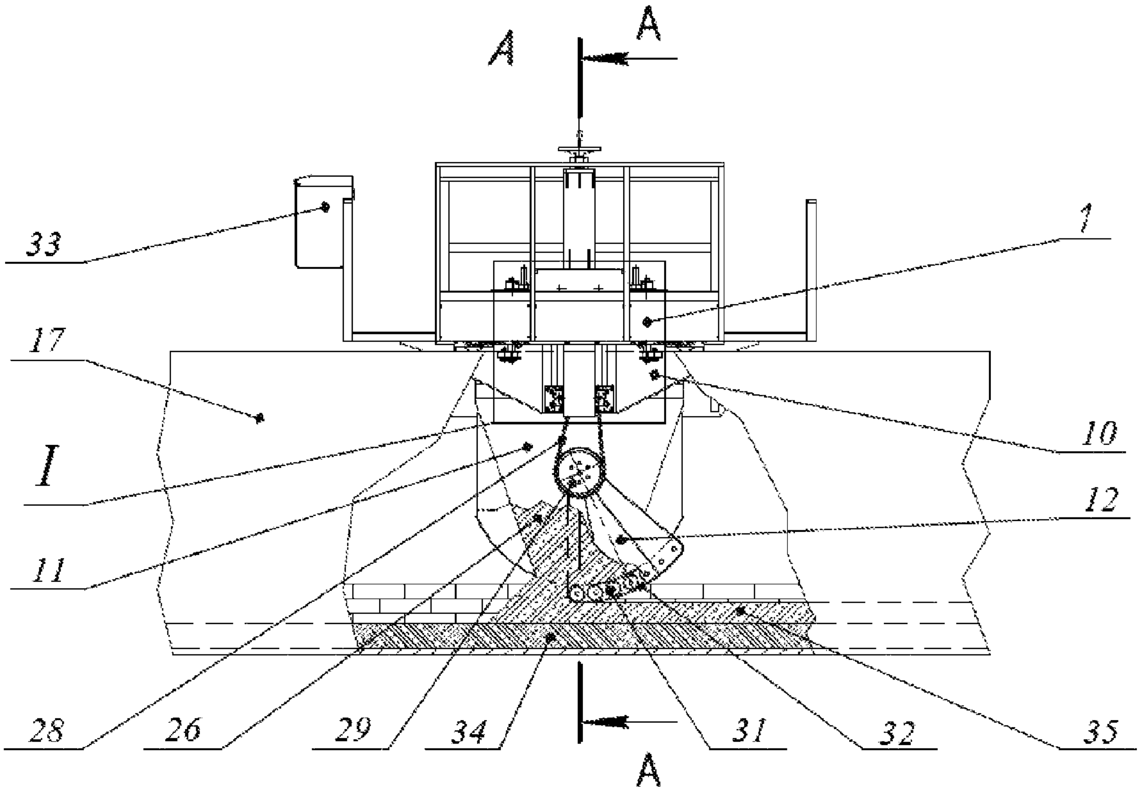
FIG. 2 shows the device in its operating position.
Figure 3:
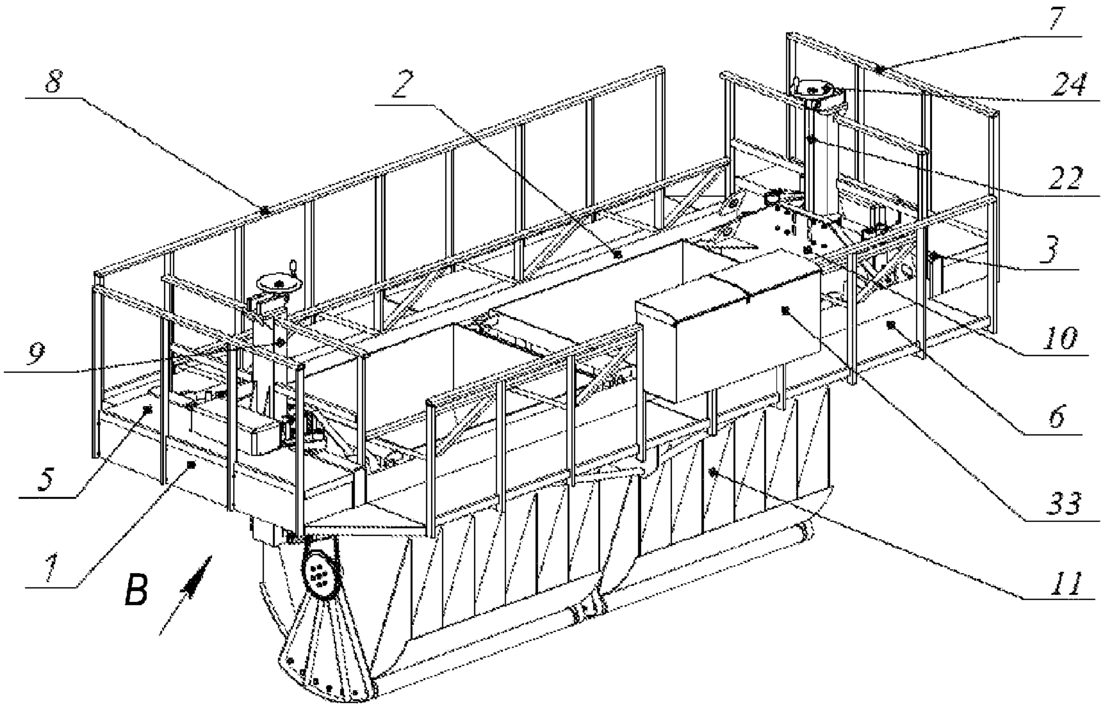
FIG. 3 shows the general view of the device.
Figure 4:
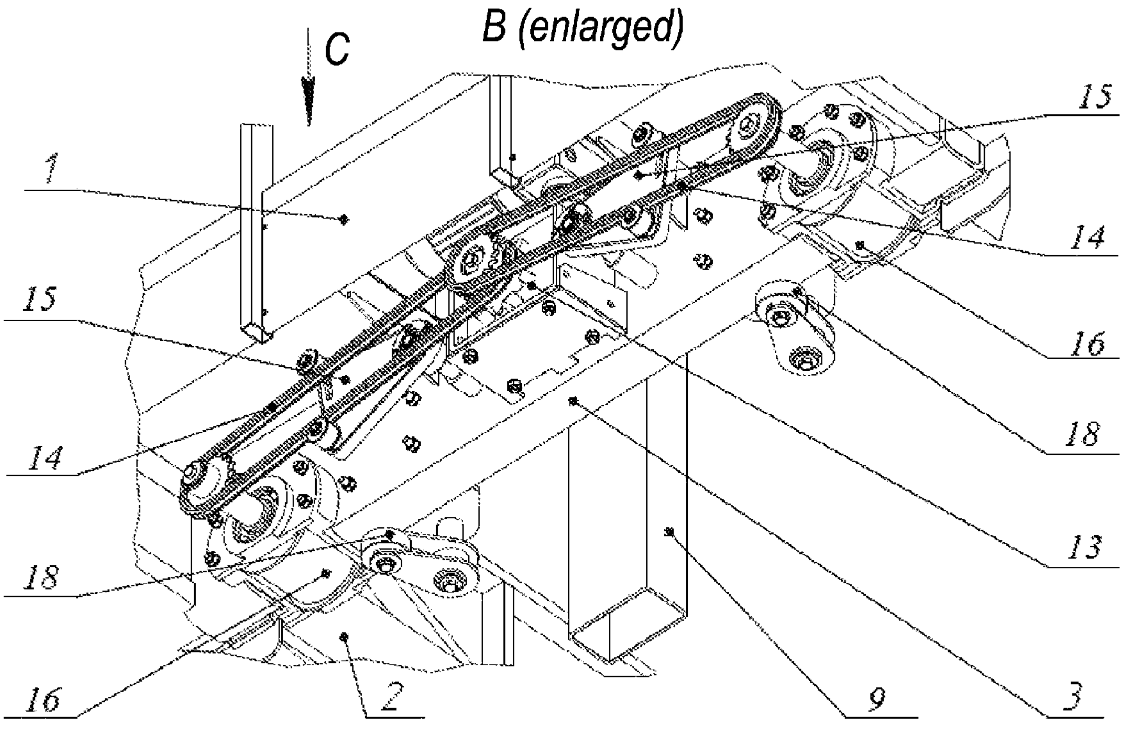
FIG. 4 shows the view along arrow B.

Each cassette 11 is provided with a belt-roller sector gate 12 (FIG. 2, 8) equipped with a mechanical actuator 25.

The cassette 11 is a bin configured as a prism in the upper part and as a truncated wedge reinforced with stiffeners in the lower part.

The belt-roller sector gate 12 with the mechanical actuator 25 comprises a gear motor 27, a drive sprocket (not shown in the figures) arranged on the output shaft of the gear motor, a chain gear 28, a driven sprocket 29 and a pivoting shaft 30, and provides an outlet for unformed lining materials through a window in the lower part of the cassette. The belt-roller sector gate 12 is also equipped with a bank of rollers 31 covered with a circular conveyor belt 32 that bears against the outlet window of the cassette 11, thus preventing the material from spilling and reducing the force required to open and close the window.

Slide gates, disk valves or simple valves may be an alternative, but the belt-roller sector gate is more reliable and has a simpler design.

The gate is preferably composed of a pivoting shaft with sector plates rigidly fixed on its ends. Rollers that are in a circular rubber belt are fixed on the plates. When the shaft rotates, the rollers roll over the surface of the cassette and open or close the outlet orifice.

The device is controlled by buttons and switches arranged on a panel 33, which may be secured to the outer side of the railing 8 of the bridge 1.

EMBODIMENTS OF THE INVENTION

The method comprises laying the materials while simultaneously spreading them over the surface of the base, and leveling them at a level measured from the plane of the upper edge of the cathode assembly shell of the electrolysis cell by successively moving the device for installing unformed lining materials along the longitudinal axis of the cathode of the Aluminium electrolysis cell. Two and/or more lining layers with variable physical and performance properties are formed in succession. The device is configured as a bridge equipped with a mechanical actuator for movement and provided with scaffolds and railings along the perimeter. The bridge has guides on which a frame is arranged for vertical movement with cassettes, each equipped with a gate. The mechanical actuator of the bridge is mounted on both ends, each having two wide drive wheels receiving movement from the gear motor using chain gears equipped with tensioners for reverse gears. The bridge is equipped with discretely adjustable thrust rollers. The frame is equipped with two sets of smoothly adjustable guide rollers. Traction screws are pivotally suspended on the frame guides and engage with nuts pivotally mounted to the frame. Each cassette is provided with a belt-roller sector gate equipped with a mechanical actuator.

The proposed method of forming lining layers in the cathode shells of Aluminium electrolysis cells using unformed lining materials is implemented with a device designed for the same purpose as follows.

Figure 5:
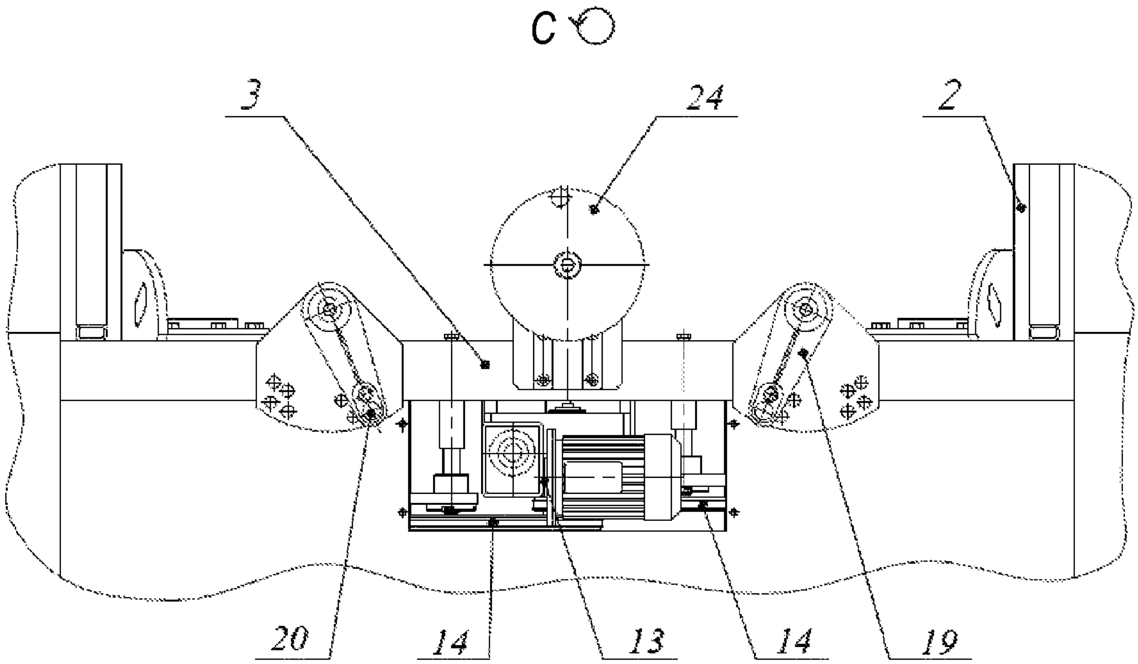
FIG. 5 shows the view of thrust rollers along arrow C.
Figure 6:
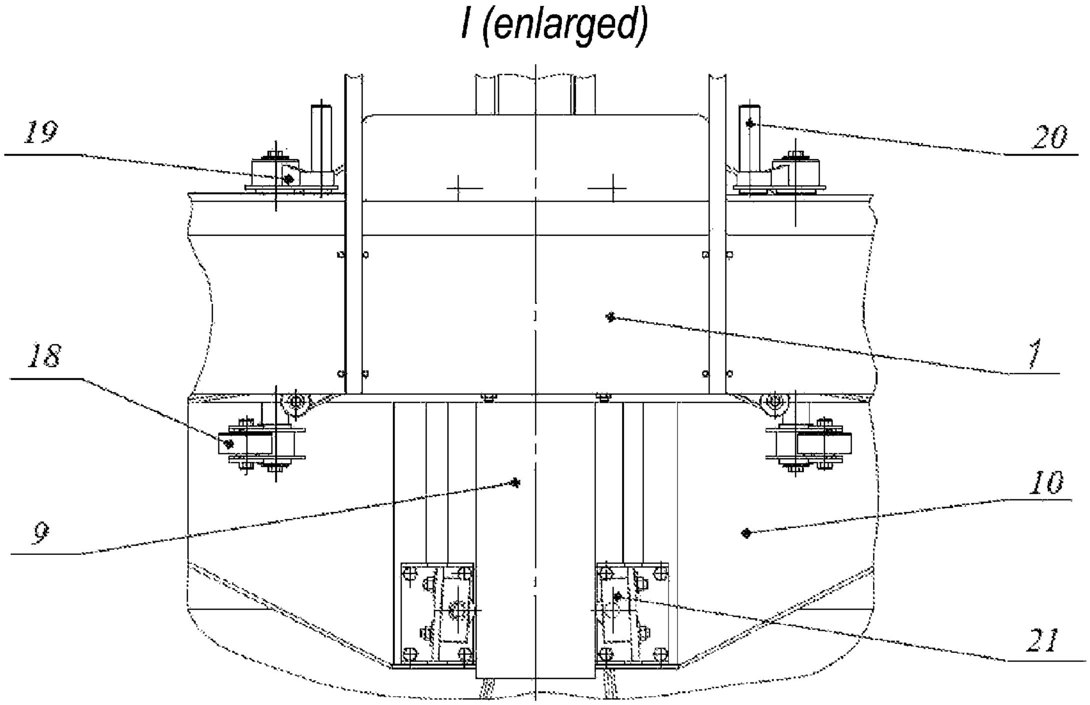
FIG. 6 shows detail section I indicated in FIG. 2.
Figure 7:
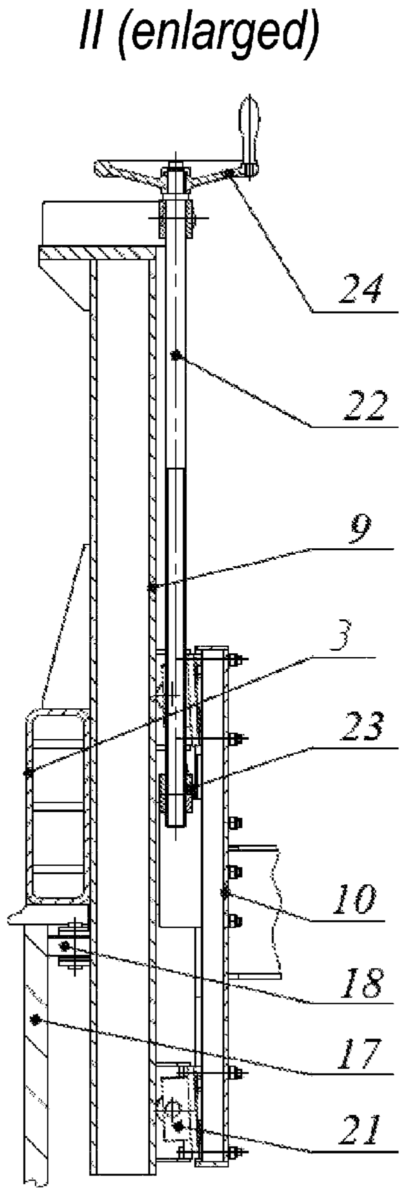
FIG. 7 shows detail section II indicated in FIG. 1.
Figure 8:
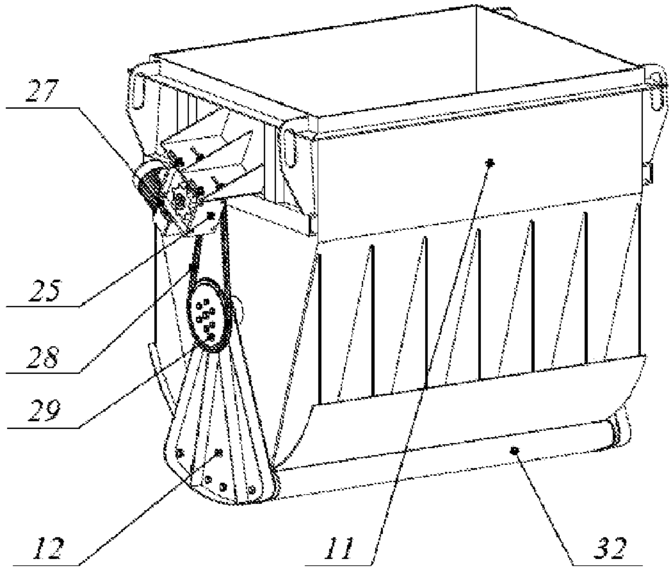
FIG. 8 shows the general view of the cassette.

The device, comprising two longitudinal beams 2, two transverse beams 3, and the railing 8, is arranged on the longitudinal sides 17 of the cathode shell of the electrolysis cell. The bridge 1 is aligned by pressing the rollers 18 against the inner surface of the longitudinal sides 17 by turning the levers 19 and setting the retainers 20 in the closest slots (not marked by a reference number in FIG. 5). The guide rollers 21 are set on the frame 10 by moving them on inclined planes until their contact with the guides 9 of the bridge 1 and by fixing them. This allows for free and clearance-free vertical movement of the frame 10. A gap equal to the thickness of the first layer 34 being laid is set between the belt-roller sector gate 12 of the cassette 11 and the bottom of the cathode shell of the electrolysis cell. The gap is set by rotating the traction screw 22 with the flywheel 24 by raising or lowering the frame 10 with the cassettes 11. The cassettes 11 are removed from the frame 10 with the shop crane and positioned in the place (not shown in the figures) where the cassettes are filled with a relevant unformed lining material required to form the first lining layer 34. After filling, the cassettes are reinstalled into the frame using the shop crane.

The cable connectors (not shown in the figures) of the cassettes 11 are connected to the appropriate receptacles on the control panel 33, and the control panel is connected to the 50 Hz 380 V three-phase AC power supply. The gear motors 13 of the mechanical actuators 4 of the bridge 1 are started on the control panel 33. The torque from the output shafts of the gear motors 13 is transmitted via the chain gears 14 to the driven sprockets arranged on the shafts of the wide drive wheels 16. The device is moved along the longitudinal sides 17 of the cathode shell of the electrolysis cell. During movement, slight slippage of the wide drive wheels 16 of the bridge 1 may occur, skewing the device. By using a converter to change the frequency of the alternating current feeding the electric motors of the gear motors 13 of the mechanical actuators 4 of the bridge 1, the device aligned with the thrust rollers 18 is steered to ensure that it moves strictly along the longitudinal sides 17 of the cathode shell of the electrolysis cell.

The device is installed at one end of the cathode shell of the electrolysis cell. The control panel 33 is then used to start the gear motors 27 of the mechanical actuator 25, which drives the driven sprocket 29 and the pivoting shaft 30, which moves the belt-roller sector gate on free-wheeling rollers on which the circular conveyor belt 32 is installed. For convenience of filling the end zones of the cathode assembly, the belt-roller sector gate can be opened by the actuator in any direction. When the gate opens, the unformed lining material pours out and fills the space between the shell bottom and the gate surface.

The gear motors 13 of the mechanical actuators 4 of the bridge 1 are started on the control panel 33 so that the device moves to the opposite end of the cathode shell of the electrolysis cell and the first lining material layer 34 can be formed. A lining material layer is formed by two processes progressing simultaneously: pouring out the material and leveling the material with the gate surface.

When the first layer 34 is completed, the belt-roller sector gates 12 of the cassettes 11 are closed. The cassettes 11 are removed from the frame 10 with the shop crane and positioned in the place (not shown in the figures) where the unformed lining material used to lay the first layer is removed from the cassettes. When the cassettes 11 are filled with an unformed lining material 26 having other physical and performance properties (porosity, thermal conductivity, heat insulation) specified according to the technology and caused by the design features of the electrolysis cell, the cassettes with the material are reinstalled into the frame 1.

Note that barrier materials and heat-insulating materials have few similar properties and many differing properties. The table below lists examples of properties.

| Materials | Density, kg/m3 | Porosity, % | Thermal Conductivity Coefficient, W/mK | Cryolite Resistance | Operating Temperature, ° C. |
|---|---|---|---|---|---|
| Refractory | ~2,000 | 15-20 | 0.65 | Good | 1,350 |
| Heat-insulating | 300-600 | 75-90 | 0.08-0.1 | Bad | 800-1,000 |

The main purpose of the lining of cathode assemblies of electrolysis cells is to provide the required temperature conditions in the inter-electrode space. This is achieved by installing the required heat insulation. However, bottom blocks are heterogeneous substances with a solid constituent that is well wetted with fluoride salts penetrating through open pores. This allows for the ingress of molten fluoride salts and aggressive fluorine-containing gases into underlying zones. Various barrier materials are used to protect the heat insulation. The requirements to barrier and heat-insulating materials are diverse and somewhat contradictory.

Traditionally, shaped products in the form of bricks of various sizes, primarily with aluminosilicate composition, are used in the structures of cathode assemblies of electrolysis cells as barrier materials to protect the underlying heat-insulating materials. This is due, primarily, to their relatively low cost and the properties of the resultant products of interaction with fluoride salts and sodium vapors. Modern high-quality barrier bricks for cathodes of Aluminium electrolysis cells have a low apparent porosity (up to 13%) and small pore sizes to reduce the ingress of aggressive gaseous and liquid components into the heat-insulating layers. However, the gas permeability of the barrier masonry as a whole is determined not by the properties of individual bricks, but mostly by the condition of joints between them. Therefore, an alternative to masonry are unformed materials compacted directly in the cathode assembly.

The amount of fluoride salts penetrating a barrier depends on the particle size distribution of the initial powdered mixture, the compaction method, and the conditions of the subsequent thermal and chemical exposure.

According to Darcy's law, the driving force of the process of penetration of molten fluoride salts is the pressure gradient along the height of the barrier material.

$$q = -\frac{k}{\mu}\frac{dP}{dx}, \quad (1)$$

where: q is the volumetric flow of fluoride salts through the cross-section S, m3/(m2s); k is the permeability coefficient, $m^2$; dP/dx is the pressure gradient along the barrier material height, Pa; μ is dynamic viscosity, Pa*s.

The permeability coefficient included in equation (1) depends on the size and number of pores and can be estimated based on structural parameters: open porosity amount, pore size distribution, and the sinuosity coefficient of pores:

$$\kappa = \frac{\varepsilon \cdot \overline{D}^2}{32\tau}, \tag{2}$$

where: ε is open porosity; $\overline{D}$ is the average pore radius; τ is the sinuosity coefficient of pores.

For polydisperse materials, if the following relationship is satisfied:

$d_{min}/d_{max} \geq 3$, $\overline{D}^2$ is calculated using the formula:

$$\overline{D}^2 = \frac{1}{\varepsilon} \int_{d_{min}}^{d_{max}} D^2 \cdot \varphi(D) dD, \tag{3}$$

where: $d_{min}$,$d_{max}$ is the minimum and maximum radii of pores, respectively; φ(D) is the size distribution of pores.

For large pores (more than 100 μm), the pressure gradient is mainly caused by hydrostatic and gravitational forces. For channel pores (5-25 μm in size), the pressure gradient is much higher than for large pores due to the potential energy of the field of capillary forces; such capillaries can actively absorb molten fluoride salts. If the pore sizes are smaller than the critical value determined using the relationship:

$$d_{cr} = 0.286\sigma \frac{\cos\Theta}{\rho g l}, \tag{4}$$

where: dcr is the critical pore size, m; σ is surface tension, N/m2; θ is the wetting angle; ρ is density, kg/m3; g is gravitational acceleration, m/s2, then the action of gravitational and hydrostatic forces on fluoride salts in capillaries can be neglected, and the pressure can be calculated using the formula:

$$P = 4\sigma \frac{\cos\Theta}{d}. \tag{5}$$

For such channel pores in the form of thin cylindrical tubes wherein laminar flow conditions are realized with the predominance of viscous forces over inertial forces (Re<<1) in accordance with Hagen-Poiseuille's law, the volumetric flow rate per second is proportional to the capillary diameter to the fourth power:

$$q = \frac{\pi d^4}{8\mu} \frac{\Delta P}{l}, \tag{6}$$

where q is the volume of liquid flowing through the capillary cross-section per second; l and d are the capillary length and diameter, respectively; ΔP is the differential pressure, Pa.

Therefore, the hydraulic resistance to the flow of liquid is very high for such pores, and they are filled not by the capillary flow of the melt, but by the evaporation and condensation of vapors on pore walls.

For porous materials with evenly distributed and mutually disjointed pores in the form of cylindrical channels with a small cross-section, the permeability coefficient can be determined using the relationship:

$$k = P\frac{d^2}{32}, \tag{7}$$

where: P is porosity; d is the pore size, m.

With a decrease in pore size, the amount of penetrating electrolyte components is reduced and the difference in the permeability coefficients caused by the different porosity values drops out of the equation. Therefore, barrier materials should have the densest structure possible and minimal porosity.

Heat-insulating materials, on the contrary, should have the highest porosity possible because the gases in pores have the best heat-insulating properties. Note that the thermal conductivity coefficient depends not only on the total porosity of a material, but also on the pore size and shape, the nature of the structure and the mineralogical composition. With a decrease in pore size, free convection in the pores of a heat-insulating material decreases, while its heat resistance and mechanical strength increase. That is why modern microporous heat-insulating materials with pores smaller than 0.1 μm have the lowest thermal conductivity under normal technical conditions.

As the temperature increases, the thermal conductivity coefficient of microporous materials becomes higher than that of materials with larger pores due to the increased fraction of energy transferred through the heat insulation structure by radiation. Therefore, there is an optimum pore size distribution depending on the temperature. For this reason, the number of heat insulation layers along the height of the sub-cathode space may be more than one. However, an excessive number of heat-insulating layers is undesirable due to the reduced workability. The formation of 2 or 3 heat-insulating layers is the most reasonable solution.

Inaccurate installation of lining layers can adversely affect the service life of electrolysis cells. It is important that the design of the cathode assembly and the lining materials provide a steeply dipping isotherm of the liquidus temperature of penetrating fluoride salts in the periphery, and it must be positioned horizontally in the center of the cathode assembly bath. The isotherm should be located outside the cathode block (to avoid sodium condensation, which destroys the cathode block structure), without entering the heat insulation layer.

Excessive heat insulation shortens the service life of electrolysis cells. "Overinsulation" causes higher temperatures of barrier materials and deeper penetration of fluoride salts down to the heat insulation. The impregnation of barrier materials with electrolyte components at early stages of electrolysis cell service increases their thermal conductivity coefficient and causes the restructuring of temperature fields, resulting in downward movement of the isotherm.

The less dense the barrier layer material, the deeper the isotherm moves down and the greater amount of the barrier material is found in the high temperature zone, being exposed to chemical action throughout its volume, resulting in volumetric changes that produce a vertical effect on the bottom blocks.

In view of the above, the amount of molten fluoride salts and aggressive fluorine-containing gases penetrating the barrier layers can be reduced by creating a mostly finely porous structure of barrier materials with pore sizes smaller than 3-5 μm to exclude the dangerous interval of capillary pores from the structure, by adding silicon-containing components to the unformed barrier material, and by selecting heat-insulating materials that provide optimum heat resistance of the base and the preset isotherm position. In each specific case, the dimensions of the functional layers may vary as determined by the electrolysis cell design and the type of lining materials used.

The operation cycle of the device is then repeated for each layer: a subsequent layer 35 having the process-specific thickness is formed with the unformed lining material 26.

When dispersed carbon materials are used as lining materials, reaction (1) can occur:

$$0.5N_2+3Na+3C=3NaCN \quad (1).$$

Cyanides are environmentally hazardous substances, which can be suppressed by adding various substances to the lining materials. For example, boron trioxide can be used, which interacts with cyanides according to reaction (2):

$$3NaCN+6B_2O_3=2NaBO_2+2Na_2B_4O_7+2BN+6C \quad (2).$$

Another substance that destroys cyanides is Aluminium oxides, which react with cyanides according to reaction (3):

$$1.5NaCN+3Al_2O_3+3Na=4.5NaAl_2O_3+1.5AlN+1.5C \quad (3).$$

Therefore, the composition of unformed materials can include materials that perform barrier functions both with respect to penetrating liquid and gaseous components, and with respect to temperature, as well as heat-insulating layers with different structures and chemical and mineralogical compositions.

This method of forming lining layers in the cathode shells of Aluminium electrolysis cells and the device for its embodiment allow the combined functional-gradient structure of the electrolysis cell cathode assembly lining to be obtained. At temperatures of up to 400° C., materials having the lowest apparent density are the most effective, while denser heat-insulating materials with pores smaller than 10 μm have an advantage at temperatures above 600° C. Therefore, the method of forming lining material layers will be more efficient when two or more heat-insulating layers with variable thermophysical properties are formed in succession, as described above.

The optimum speed of the device for forming lining layers is 0.1-0.9 m/min. At a speed of less than 0.1 m/min, the device productivity decreases unreasonably, and when the speed is above 0.9 m/min, the quality of laying the lining material deteriorates and dusting of the lining material occurs.

The principle of leveling the material using the "tail" of the machine is well known from other arts, but in the proposed technical solution, the device is unique in its ability to change the "tail" to the "head" and vice versa. This is particularly important when the work is performed in the constrained environment of the cathode assembly. For example, given the operating position of the gate with the unit moving from left to right: in the initial state (rightmost), the gate is in the mirror position and the material is poured into the space between the gate and the cathode end; the gate is then set into its operating position and movement of the unit to the left is started. This allows movement in different directions.

In addition, with this gate, the height of the resultant layer may be increased or decreased.

The above method of forming the cathode shells of Aluminium electrolysis cells with unformed lining materials and the device for its embodiment will produce a total economic effect of at least $4.14 thousand per 1 electrolysis cell annually by reducing the downtime of electrolysis cells in overhauls, extending the service life of electrolysis cells, and reducing labor inputs required to spread the material over the base surface. In addition, the method improves the sanitary working conditions for the personnel due to reduced dusting of the material.

The invention claimed is:

1. A method of forming one or more lining layers in a cathode shell of an Aluminium electrolysis cell, the method comprising:

pouring one or more layers of at least one lining material onto a bottom of the cathode shell, each layer of the one or more layers being spread and leveled over a surface of the cathode shell, simultaneously spreading and leveling a layer comprised in the one or more layers of the at least one lining material over the surface of the cathode shell by means of a belt-roller sector gate, wherein:

the leveling is executed at a preset level measured from a plane of an upper edge of the cathode shell of the Aluminium electrolysis cell, and one or more lining layers are formed in succession with similar or different physical and performance properties specified according to design features of the Aluminium electrolysis cell.

2. The method of claim 1, wherein the layer of the at least one lining material is poured and spread over the surface of the cathode shell and leveled at a rate of 0.2-0.9 m/min.

3. The method of claim 1, wherein:

a rate of pouring the layer of the at least one lining material and parameters of spreading and leveling the layer are controlled, and operating conditions are adjusted.

4. The method of claim 1, wherein the physical and performance properties include one or more of porosity, thermal conductivity, and heat insulation.

* * * * *